United States Patent [19]

Justice

[11] Patent Number: 5,072,972

[45] Date of Patent: Dec. 17, 1991

[54] COUPLING DEVICE

[76] Inventor: Donald R. Justice, P.O. Box 458, Matlacha, Fla. 33909

[21] Appl. No.: 603,601

[22] Filed: Oct. 26, 1990

[51] Int. Cl.$^5$ .............................................. F16L 21/02
[52] U.S. Cl. ..................................... 285/373; 285/419; 285/903; 285/173; 285/423; 285/915
[58] Field of Search ............... 285/903, 915, 373, 419, 285/292, 284, 423, 174, 173

[56] References Cited

U.S. PATENT DOCUMENTS

| | | | |
|---|---|---|---|
| 539,112 | 5/1895 | Barrett | 285/284 |
| 1,755,898 | 4/1930 | Root | 285/284 X |
| 3,669,473 | 6/1972 | Martin et al. | 285/903 X |
| 3,951,439 | 4/1976 | Schmunk | 285/903 X |
| 4,084,844 | 4/1978 | Abner | |
| 4,149,740 | 4/1979 | Hall | 285/903 X |
| 4,171,834 | 10/1979 | Abner | 285/903 X |
| 4,443,031 | 4/1984 | Borsh et al. | 285/903 X |
| 4,470,622 | 9/1984 | Pate et al. | |
| 4,683,917 | 8/1987 | Bartholomew | 285/903 X |
| 4,723,796 | 2/1988 | Nattel | 285/903 X |
| 4,795,197 | 1/1989 | Kaminski et al. | 285/903 X |
| 4,797,512 | 1/1989 | Kamagai et al. | 285/903 X |
| 4,856,826 | 8/1989 | Engel et al. | 285/903 X |
| 4,871,198 | 10/1989 | Hattori et al. | 285/903 X |
| 4,871,281 | 10/1989 | Justice | |
| 4,902,048 | 2/1990 | Washizu | 285/915 X |

FOREIGN PATENT DOCUMENTS 7507218 12/1976 Netherlands ......................... 285/903

*Primary Examiner*—Dave W. Arola
*Assistant Examiner*—Carol I. Bordas
*Attorney, Agent, or Firm*—Fleit, Jacobson, Cohn, Price, Holman & Stern

[57] ABSTRACT

A coupling device which, as a coupler, provides the necessary strength for coupling deep trench installations of corrugated polyethylene drainage pipes without hanging up during feeding through a trenching tool and also allows the joining of the corrugated polyethylene pipes with various other standard pipe materials inclusive of acrylonitrile butadiene styrene and polyvinyl chloride, by the use of standard marketplace glues, solvents and adhesives. The two halves of the coupling device, when used as a coupler, are placed around two abutted ends of adjacent drainage pipe sections, allowing for three corrugations of each of the two corrugated drainage pipe sections to be surrounded and interlocked with radially inwardly projecting ribs of the coupling device. When used as a coupler, the coupling sections are held in place by a band or tape. When the coupling device is used as an adapter, the radially inwardly projecting ribs of the coupling halves surround and engage six corrugations of an end of a corrugated drainage pipe. The smooth cylindrical exterior surface of the coupling device is then fitted within a smooth interior wall of a PVC header, pipe, pump section or discharge pipe. The coupling device used as an adapter is held within PVC pipe by glues, solvents and/or adhesives.

13 Claims, 2 Drawing Sheets

COUPLING DEVICE

FIELD OF THE INVENTION

This invention relates to the field of joining corrugated pipes by a coupling device which is held in place by banding or taping when used as a coupler and by glues, solvents and/or adhesives securing the coupling device with a corrugated pipe contained therein when used as an adapter.

BACKGROUND OF THE INVENTION

When using corrugated polyethylene drainage pipes buried over extended lengths, it is necessary to couple the ends of adjacent sections of the pipes. The connected lengths of pipe are fed through a trenching machine as disclosed in my U.S. Pat. No. 4,871,281. It is imperative that any coupling device used between lengths of pipe have a smooth exterior to avoid "hang-up" of the pipe as it is fed into a trench through guide openings.

It may also be necessary to join one end of a section of corrugated drainage pipe to vertical PVC headers, pipes, pump sections and discharge pipes. Due to the polyethylene composition of the corrugated drainage pipe, it is not readily possible to achieve a bond with adjacent PVC pipe sections through commercially available adhesives.

Examples of plastic pipe couplings are found in U.S. Pat. No. 4,084,844 to Abner, U.S. Pat. No. 4,871,198 to Hattori et al., U.S. Pat. No. 4,760,622 to Pate et al., U.S. Pat. No. 4,443,031 to Borsh et al., and U.S. Pat. No. 4,795,197 to Kaminski et al.

U.S. Pat. No. 4,084,844 to Abner discloses a device for connecting corrugated drainage tiles. The device is a flexible sleeve which is held together and in place against linear movement by special "tabs", which not only close adjacent sections of drainage tile, but when the sleeve is overlapped upon itself, the tabs penetrate exterior grooves to hold the linear position of the device. This device cannot be used as a coupling for feeding through a trenching tool without "hang-ups" due to its overlapped edges or as an adapter to smooth bore pipes due to its overlapped portions forming an asymmetrical configuration. Further, the sleeve is not made of materials suitable for adapting polyethylene materials to polyvinyl chloride pipe.

U.S. Pat. No. 4,871,198 to Hattori et al. discloses a clamp-type corrugated plastic type coupling which is clamped with a split mold having flanges. The coupling includes an outer coupling member having corrugations along its inner surface and a packing member arranged inside the outer coupling member. This coupling is a special pressure type coupling particularly for underground electrical conduits and sewage pipe installations which require extreme water tightness. The clamping flanges and external components preclude the implementation of this device as a coupler for feeding through a trenching tool without "hang-ups" or as an adapter to smooth bore pipes, fittings, or other receptacles.

U.S. Pat. No. 4,470,622 to Pate et al. discloses a system of flexible conduit and fittings useful particularly for conveying, supporting and connecting electrical service cables and wires. The conduit and fittings are made of polyvinyl chloride and due to the exterior configuration of the fittings implementation as a coupler for feeding through a trenching tool without "hang-ups" or as an adapter to smooth bore pipes, fittings or other receptacles is infeasible.

U.S. Pat. No. 4,443,031 to Borsh et al. discloses a connector fitting for interconnecting flexible corrugated conduit sections which includes a pair of arcuate sections joined by flexible straps having corrugation engaging ribs. This device relates to joining or coupling a pair of flexible corrugated conduit sections of the type used as a raceway for electrical conductors. The corrugated conduit sections are connected end to end with external bands which project well beyond the periphery of the connector fitting. A strong conduit connector for electrical raceways results which is incapable of serving as a coupler for feeding through a trenching tool without "hang-ups" or as an adapter to smooth bore pipes, fittings or other receptacles.

U.S. Pat. No. 4,795,197 to Kaminski et al. discloses a coupling for seed and fertilizer hoses. Two portions are molded as a single unit with an integral hinge and locking structure located on the periphery of the coupling. The peripheral structure precludes the use of this coupling as a coupler for feeding through a trenching tool without "hang-ups" or as an adapter to smooth bore pipes, fittings or other receptacles.

SUMMARY OF THE INVENTION

It is therefore an object of the present invention to overcome the disadvantages of the prior coupling devices which lack the advantage of being capable of being fed through a trenching tool and lack also the possibility of being used as an adapter within the smooth bore of a pipe, fitting or other receptacle.

The unique characteristic of the polyethylene material utilized in corrugated drainage pipe manufacturing precludes the ability to bond the drainage pipe in any rapid manner with solvents, glues or adhesives, to dissimilar materials. Further, in the coupling of various lengths of corrugated polyethylene drainage tubing with polyethylene couplings, the necessity of strength for deep trenching monolithic installations is not available.

By the present invention, a coupling device has been developed which provides not only the necessary strength for coupling deep trench installations of corrugated polyethylene drainage pipes, but also allows the joining of the corrugated polyethylene pipes with various other standard pipe materials inclusive of acrylonitrile butadiene styrene and polyvinyl chloride, by standard marketplace glues, solvents and adhesives.

The coupling device of the present invention is manufactured by pressing a sheet of material capable of being adhesively bonded to PVC or other materials used for a header, pipe, pump section or discharge pipe to which it would be advantageous for a polyethylene drainage pipe to be connected. Preferably, acrylonitrile butadiene styrene material would be used. The sheet is placed in a steel material mold which has been heated. Under a high pressure pressing mechanism, a semi-circular section of the two sections required to form the coupling device of the present invention is produced.

The two halves of the coupling device, when used as a coupler, are placed around two abutted ends of adjacent polyethylene drainage pipe sections, allowing for three corrugations of each of the two corrugated drainage pipe sections to be surrounded and interlocked with radially inwardly projecting ribs of the coupling device.

When used as a coupler, the coupling sections are held in place by a band or tape.

When the coupling device is used as an adapter, the radially inwardly projecting ribs of the coupling halves surround and engage six corrugations of an end of a corrugated drainage pipe. The smooth cylindrical exterior surface of the coupling device is then fitted within a smooth interior wall of a PVC header, pipe, pump section or discharge pipe. The coupling device used as an adapter is held within the PVC pipe by glues, solvents and/or adhesives.

The strength of the coupling device used as either a coupler or an adapter is far superior to any similar product since the preferred acrylonitrile butadiene styrene material of the coupling device allowing solvent weld, glue and adherence to the same or other materials such as PVC. Corrugated polyethylene drainage pipe is thereby securely held within a smooth bore of a pipe of a different material where it was previously not possible to secure the polyethylene pipe.

Further, the smooth exterior of the coupling device when used to join abutted lengths of corrugated drainage pipe allows continuous feeding of the coupled pipe sections. The smooth exterior avoids "hand-ups" or stopping when feeding the joined lengths of corrugated drainage pipe through a guide of a trenching tool into their underground position.

The outside diameter of the coupling device is substantially equal to the inside diameter of the receiving pipe or fitting and is made to accommodate standard inner diameters of 4 to 10 inches. The receiving pipe or fitting and the smooth cylindrical exterior surface of the coupling device are cleaned and coated with an appropriate adhesive and joined together in a bonding position. The receiving pipe or fitting provides the strength for containment of the ribs of the coupling device within the corrugations of the flexible polyethylene drainage pipe.

By the present invention, corrugated polyethylene drainage pipe is secured to other synthetic pipe material within a smooth interior bore of the other synthetic pipe material without expensive and time consuming heat welding processes.

It is another object of the present invention to provide two mating sections of a coupling device having a ribbed interior surface and a smooth cylindrical exterior surface for use as a coupler for joining abutted ends of two sections of corrugated polyethylene drainage pipe or as an adapter for joining one end of a corrugated polyethylene drainage pipe within a smooth wall bore of a receiving pipe or fitting.

It is another object of the present invention to provide two mating sections of a coupling device having a ribbed interior surface and a smooth cylindrical exterior surface for use as a coupler for joining abutted ends of two sections of corrugated polyethylene drainage pipe or as an adapter for joining one end of a corrugated polyethylene drainage pipe within a smooth wall bore of a receiving pipe or fitting where the coupling device is made of acrylonitrile butadiene styrene material.

It is still yet another object of the present invention to provide two mating sections of a coupling device having a ribbed interior surface and a smooth cylindrical exterior surface for use as a coupler for joining abutted ends of two sections of corrugated polyethylene drainage pipe or as an adapter for joining one end of a corrugated polyethylene drainage pipe within a smooth wall bore of a receiving pipe or fitting where the coupling device is made of acrylonitrile butadiene styrene material and the two sections of the coupling device are banded when joining two sections of corrugated polyethylene drainage pipe and secured by glue, solvent, or adhesive when used as an adapter and fitted within a smooth wall bore of a receiving pipe or fitting.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
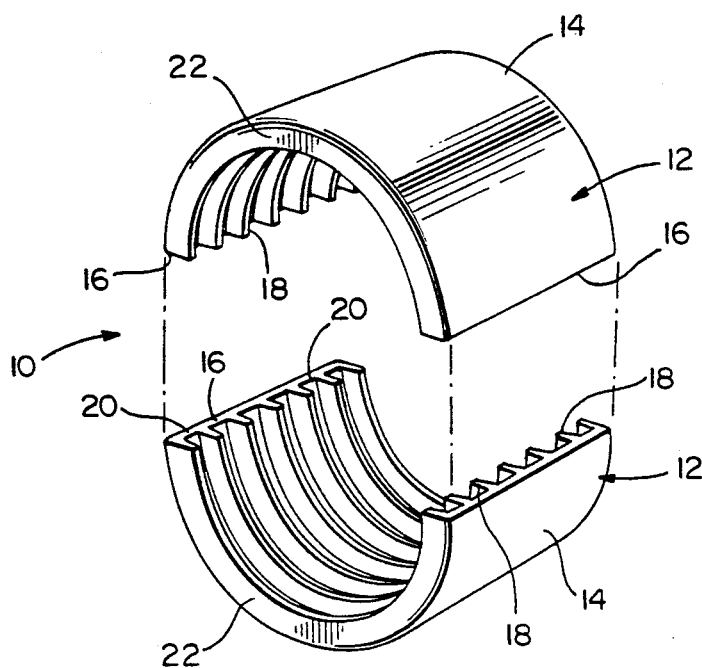
FIG. 1 is an exploded view of two sections of a coupling device.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
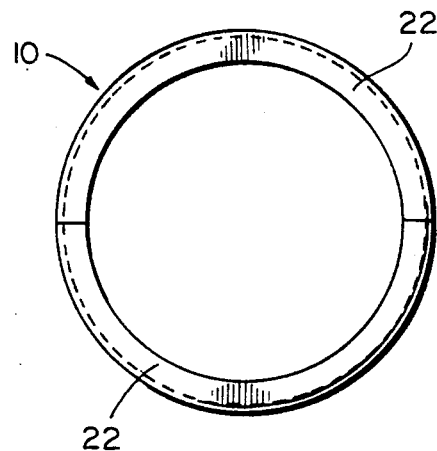
FIG. 3 is an elevational end view of the coupling device.
Figure 4:
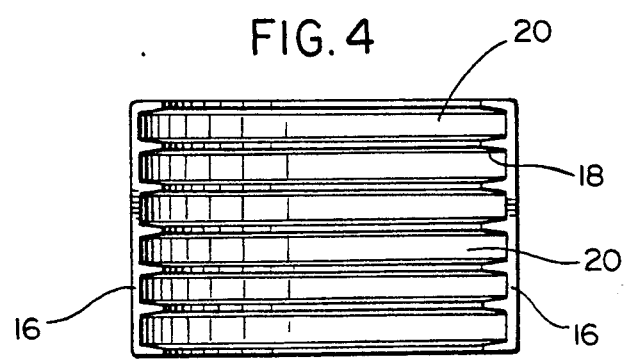
FIG. 4 is an elevational interior view of one section of the coupling device.

With reference to the drawings, in general, and to FIGS. 1, 3 and 4, in particular, a coupling device embodying the teachings of the subject invention is generally designated as 10. With reference to its orientation in FIG. 1, the coupling device comprises two coupling sections 12 which are preferably made of acrylonitrile butadiene styrene.

Each coupling section includes a smooth semi-circular, semi-cylindrical shaped, exterior wall 14 extending 180° between its end walls 16. The interior surface of the coupling section is comprised of seven radially inwardly extending ribs 18. Located between adjacent ribs are channels 20 for receipt of the peaks of corrugations of corrugated polyethylene drainage pipes. Each of the ends of each coupling section 12 is formed by a rib 18 to produce a smooth end wall 22.

When the end walls 16 of each coupling section abut the end walls 16 of an adjacent coupling section as shown in FIG. 3, a hollow interior is produced. The exterior diameter across the two mated coupling sections 12 as shown in FIG. 3 is equal to the inside diameter of a smooth wall bore of a receiving pipe or fitting.

The coupling device of the present invention is used in combination with corrugated polyethylene drainage pipe 24 having a series of alternating peaks 26 and valleys 28, forming a corrugated surface on the exterior of the drainage pipe. The drainage pipe is used to collect and convey water. The drainage pipe may include perforations for collecting water when the drainage pipe is buried below the water table.

Figure 7:
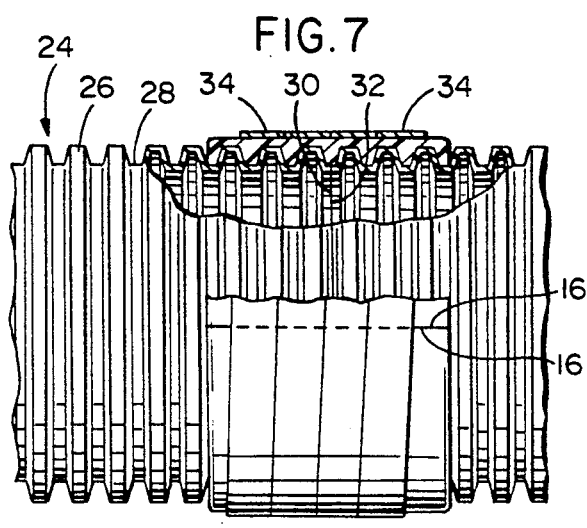
FIG. 7 is a partial sectional view of the coupling device used as a coupler to connect abutted ends of two sections of corrugated polyethylene drainage pipe.

In FIG. 7, the coupling device of the invention is shown surrounding abutted ends 30, 32 of two sections of corrugated polyethylene drainage pipe 24. Three of the peaks 26 of each section of drainage pipe are located in three of the channels 20 of the coupling device to fill all six channels of the coupling device. Similarly, the valleys 28 closest to the abutted ends of the two sections of drainage pipe contain the ribs 18 of the coupling device.

The mating ends 16 of the two coupling sections 12 are in contact with each other in FIG. 7. The two coupling sections are held in position by a series of biasing elastic bands 34 encircling the coupling sections 12 to form a rigid interconnection of the ends 30, 32 of the abutted pipe sections. The coupling sections are in symmetrical alignment along a longitudinal axis of the two sections of corrugated polyethylene drainage pipe contained within the coupling device.

In addition to its use as a coupler, the coupling device may also be used as an adapter for adhesively joining corrugated polyethylene drainage pipe with a receiving pipe or fitting of dissimilar material. Normally the polyethylene of the drainage pipe could not be bonded to a PVC pipe or other dissimilar materials. However, due to the properties of the selected composition of the coupling device, the coupling device acts as an intermediary to make possible the joining of the coupling device, to the receiving pipe or fitting with the drainage pipe held within the coupling device.

Figure 2:
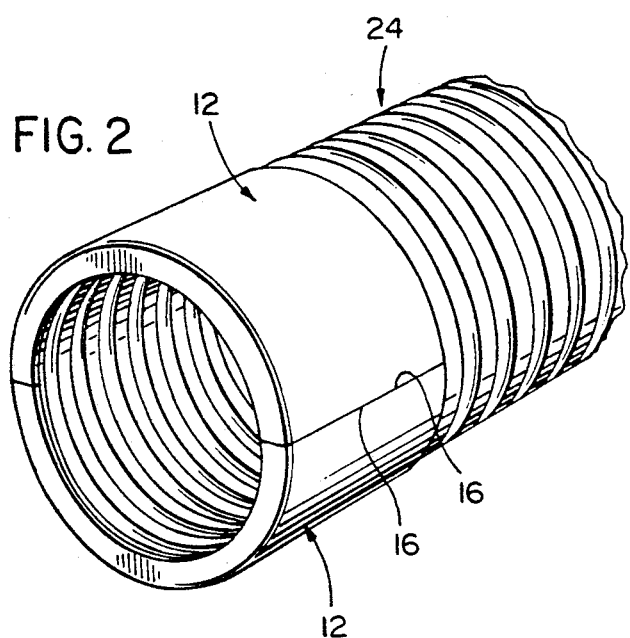
FIG. 2 illustrates the coupling device fitted onto an end of a corrugated polyethylene drainage pipe for use as an adapter.

For use as an adapter, the coupling device is fitted around the six end corrugations of a pipe 24 as shown in FIG. 2. The ends 16 of the two coupling sections 12 mate against each other.

Figure 5:
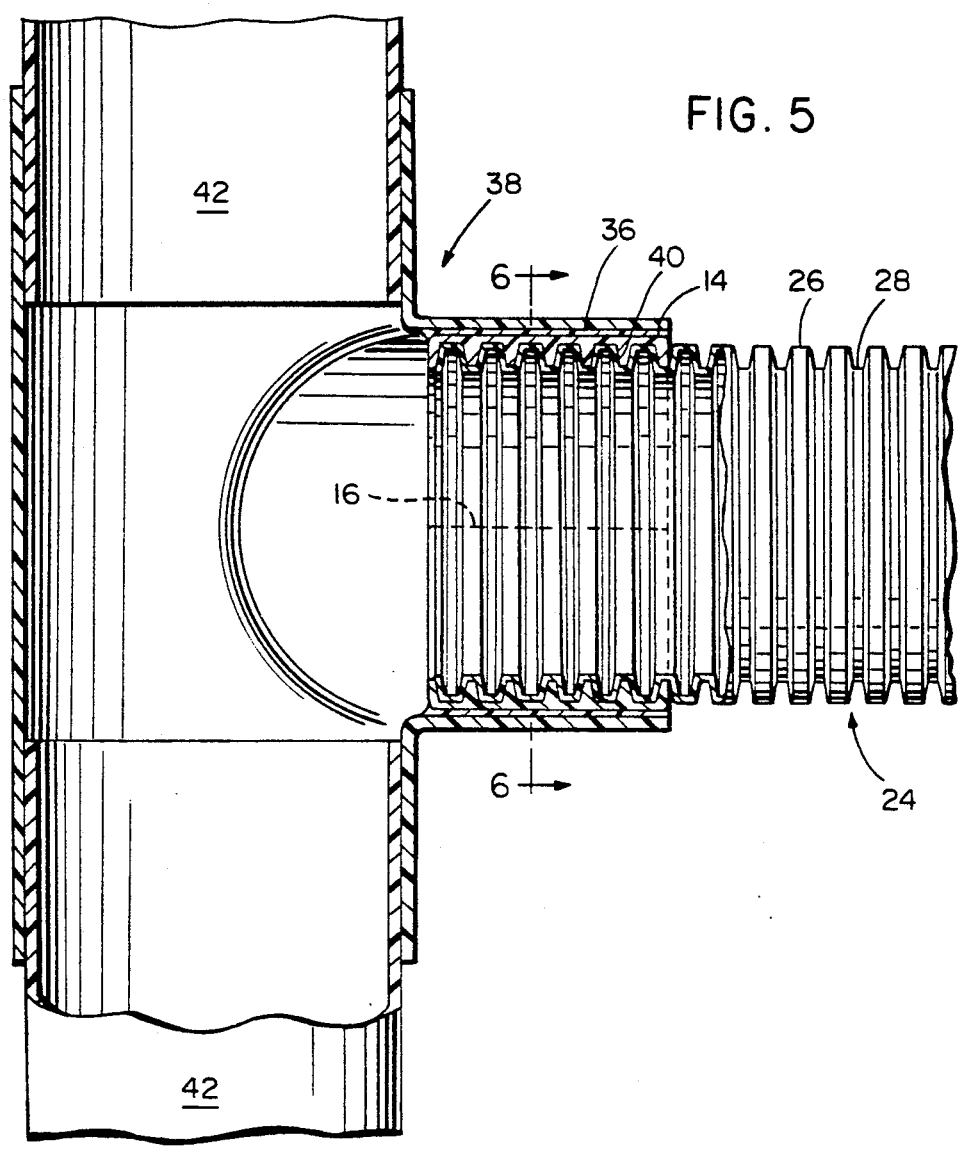
FIG. 5 is a partial sectional view of the coupling device used as an adapter for securing one end of a corrugated polyethylene drainage pipe within a smooth wall bore of a T-fitting.
Figure 6:
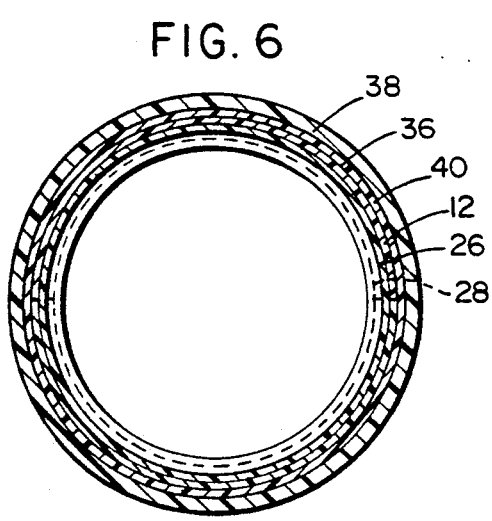
FIG. 6 is a sectional view taken along line 6—6 of FIG. 5.

As shown in FIG. 5, the smooth exterior wall 14 of the coupling sections is slid within the smooth interior wall 36 of a receiving pipe or fitting 38. In FIG. 5, a T-fitting is shown.

Between the smooth exterior wall 14 of the coupling sections 12 and the smooth interior wall 36 of the receiving pipe or fitting is located a glue, solvent and/or adhesive layer 40. The corrugated polyethylene drainage tube 24 is thereby held within the coupling device and connected to the receiving pipe or fitting 38 as are other exterior smooth wall pipe sections 42 shown in FIG. 5 as being connected to the other arms of the receiving pipe or fitting 38.

Therefore, by the present invention, a polyethylene pipe 24 may be joined with a PVC header, pipe, pump section or discharge tube of a dissimilar material from the drainage pipe 24 by an intermediary coupling device. The coupling device is made of a material which is capable of being bonded to the PVC header, pipe, pump section or discharge pipe which are made of a material dissimilar from polyethylene. A corrugated interior wall and a smooth cylindrical shaped exterior wall makes the device suitable for use as a coupler or an adapter.

Having described the invention, many modifications thereto will become apparent to those skilled in the art to which it pertains without deviation from the spirit of the invention as defined by the scope of the appended claims.

I claim:

1. A coupling device for joining abutting ends of corrugated polyethylene liquid drainage pipes and for adapting an end of a corrugated polyethylene drainage pipe to be held within the coupling device so that the coupling device may be adhesively bonded within a smooth wall bore of a receiving pipe or fitting, said coupling device comprising:
   two coupling sections for surrounding one end of at least one section of corrugated polyethylene drainage pipe,
   means for holding the two coupling sections together,
   each coupling section including a corrugated interior wall for engaging in the corrugations of an exterior wall of the corrugated polyethylene drainage pipe and said coupling sections and said means together having a continuously smooth circular exterior wall, and
   said coupling sections being made of a different material from the corrugated polyethylene drainage pipe.

2. A coupling device as claimed in claim 1, wherein said two coupling sections surround abutting ends of corrugated polyethylene drainage pipes.

3. A coupling device as claimed in claim 2, wherein said coupling sections are bound by a biased band.

4. A coupling device as claimed in claim 2, wherein opposing ends of each said coupling section abut against corresponding ends of the other coupling section.

5. A coupling device as claimed in claim 1, wherein said two coupling sections surround one end of a corrugated polyethylene drainage pipe.

6. A coupling device as claimed in claim 5, wherein opposing ends of each said coupling section abut against corresponding ends of the other coupling section.

7. A coupling device as claimed in claim 6, wherein said smooth semi-circular exterior wall of said coupling sections are adhesively bonded in a smooth wall bore of a receiving pipe or fitting.

8. A continuous length of piping for conveyance of a liquid, said continuous length of piping comprising:
   two sections of corrugated polyethylene drainage pipe,
   one end of each of said two sections of corrugated polyethylene drainage pipe located adjacent each other,
   a coupling device surrounding the adjacent ends of said two sections of corrugated polyethylene drainage pipe,
   said coupling device including two coupling sections, one of said two coupling sections having two ends abutting against two ends of the other of said two coupling sections in symmetrical alignment extending along a longitudinal axis of said two sections of corrugated polyethylene drainage pipe,
   securing means for retaining said two coupling sections in said symmetrical alignment and in engagement with said two sections of corrugated drainage pipe,
   each coupling section having a corrugated interior wall for engaging in the corrugations of the adjacent ends of said two sections of corrugated drainage pipe, and said coupling sections and said securing means together having a continuously smooth circular exterior wall, and
   said coupling sections being made of a different material from the corrugated polyethylene drainage pipe.

9. A continuous length of piping as claimed in claim 8, wherein said coupling device is made of acrylonitrile butadiene styrene.

10. A pipe and receiving fitting comprising, in combination:
- a single length of corrugated polyethylene liquid drainage pipe,
- a coupling device surrounding one end of said length of corrugated polyethylene liquid drainage pipe, said coupling device having a corrugated interior wall engaging in corrugations of said one end of said length of corrugated polyethylene liquid drainage pipe and a continuously smooth circular exterior wall,
- a receiving fitting having a smooth wall bore, and
- adhesive means for securing said smooth exterior circular wall of said coupling device having said one end of said length of corrugated polyethylene liquid drainage pipe contained therein to said smooth wall bore of said receiving fitting,
- said coupling device being made of a different material from the corrugated polyethylene liquid drainage pipe.

11. A continuous length of piping as claimed in claim 10, wherein said receiving fitting is made of polyvinyl chloride.

12. A continuous length of piping as claimed in claim 11, wherein said coupling device is made of acrylonitrile butadiene styrene.

13. A continuous length of piping as claimed in claim 10, wherein said coupling device includes two coupling sections having opposing ends with opposing ends of one coupling section abutting corresponding opposing ends of the other coupling section.

* * * * *